Patented July 10, 1951

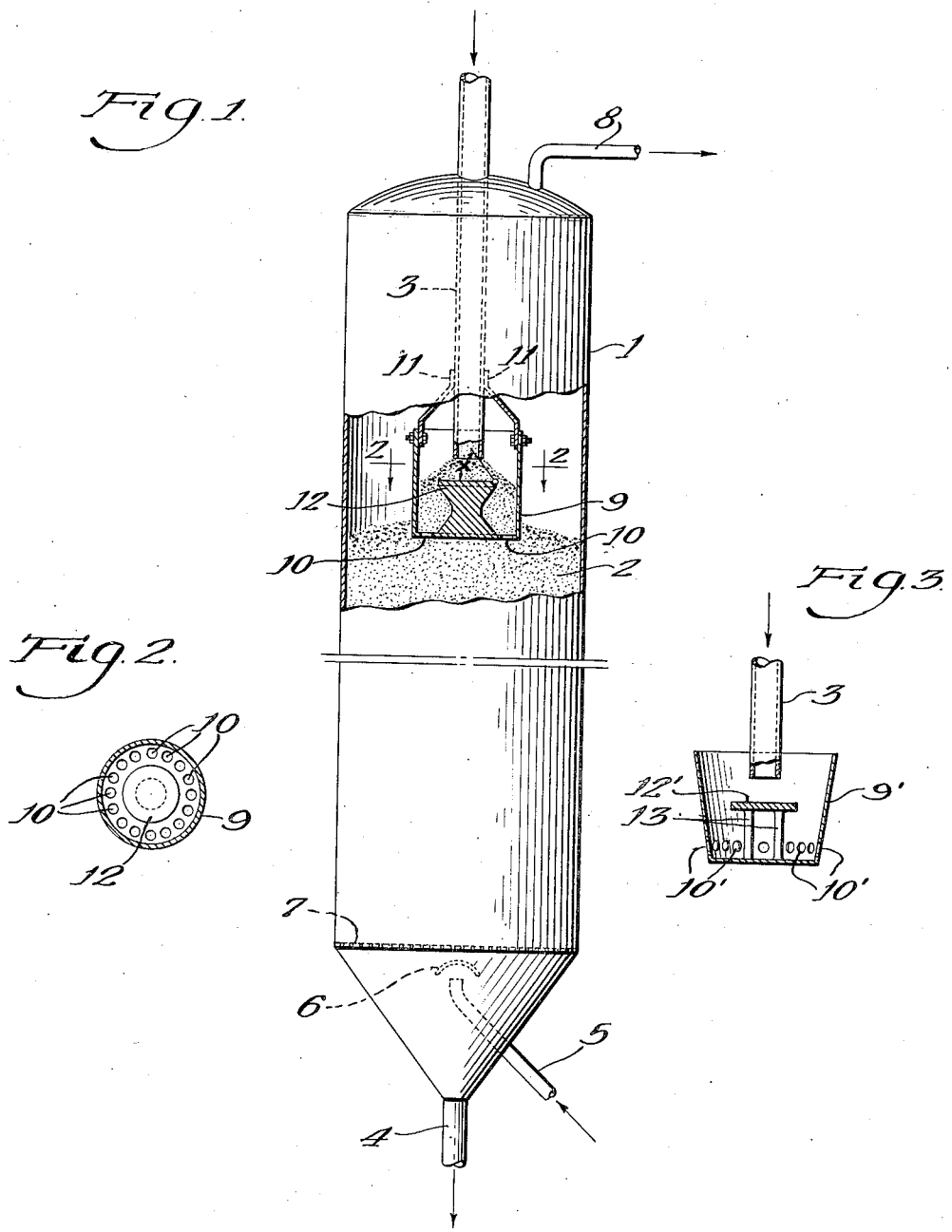

2,559,876

UNITED STATES PATENT OFFICE 2,559,876

DEVICE FOR CONTROLLING THE LEVEL OF SUBDIVIDED SOLID PARTICLES WITHIN A CONTACTING CHAMBER

James Hoekstra, Chicago, Ill., assignor to Universal Oil Products Company, Chicago, Ill., a corporation of Delaware Application August 31, 1948, Serial No. 46,982

6 Claims. (Cl. 23—288)

This invention relates to an improved device for regulating flow and for controlling the level of subdivided solid particles within a contacting chamber. More particularly, the device provides an automatic or self-operating flow regulator which maintains a substantially constant level moving or fluidized particle bed within a contacting vessel, with the particles being charged in a continuous stream by way of a transfer conduit to the upper end of the contacting chamber.

In catalytic or other processes employing a continuously moving or fluidized bed of solid granular particles, it is frequently desirable to provide means for continuously transferring the solid material from one part of the unit to another. For instance, in the fluid catalytic cracking of hydrocarbons, catalyst particles are supplied in a continuously moving stream to a reaction chamber, wherein they are contacted with a hydrocarbonaceous reactant stream to effect a catalytic conversion of the latter. The gaseous reactant stream maintains the catalyst particles in an agitated or fluidized state within a relatively dense phase bed, so that an efficient contact is effected between the catalyst particles and the fluid stream. The contaminated solid particles are normally withdrawn and passed through a stripping zone wherein volatile and gaseous matter is stripped and removed from the particles by an inert gaseous medium which contacts the particles in a fluidized and relatively dense phase bed as in the reaction zone. In a similar manner, the catalyst particles, subsequent to the stripping operation are continuously passed to a regenerator and therein contacted with an oxygen-containing stream which maintains the particles in a continuous state of agitation and thus effects a continuous contacting and reactivation of the particles within the fluidized bed. In each of the contacting zones, it is necessary to maintain a disengaging space above the fluidized catalyst bed so that the gaseous fluid leaving the vessel will be largely freed of entrained catalyst when it leaves the chamber. It is, therefore, necessary to control the flow of catalyst into and out of the vessel so as to maintain the upper limit of the catalyst dense phase bed at a predetermined level.

The principal object of this invention is to provide a device which operates automatically to maintain a substantially constant dense bed level of the solid material within a contacting chamber.

It is also an object of the invention to provide a device which is of simple construction and eliminates the need of a valve or a mechanically operated feeder in the conduit transferring particles to the contacting chamber.

Briefly, the self-regulating feeding device of this invention is adapted to be placed within the contacting chamber and to regulate the flow from a particle inlet conduit which terminates vertically therein and comprises in combination, a cup-like member having a perforated lower portion, a flat imperforate stop plate positioned centrally within the cup-like member and elevated above the bottom thereof, with the stop plate being held a short distance below and in alignment with the end of the particle inlet conduit.

Various types of apparatus and devices, other than valves and mechanically operated feeders have been used for regulating flow of granular solids from one zone to another, however, in general these devices which regulate flow through a cup-like member are not constructed to allow fairly rapid rates of transfer of the solid particles into the contacting zone and in many cases do not prevent fluidization of the solid particles within the device and at the lower end of the transfer conduit, so that as a result the level of the dense phase bed is not maintained at a constant level as is desired. The effectiveness of the regulating device to control a contacting bed level is largely dependent upon the extent to which fluidization of the solid at the lower end of the inlet conduit can be prevented. In the device of the present invention, although the gaseous medium may penetrate the holes in the bottom of the cup and fluidize the solid particles just above the holes, the larger cross sectional area provided thereabove is such as to reduce the gas velocity to the point where no fluidization occurs at the level of the elevated stop plate nor at the lower end of the inlet conduit. Therefore, in operation, the flow of particles is regulated by the rate at which the particles are withdrawn from the dense bed within the chamber and the speed with which the particles flow through the bottom of the cup-like member.

The rate of particle flow through the regulating device is not retarded or hampered by the improved apparatus of this invention in view of still another advantage which it has over similar types of apparatus. The stop plate of the device is sized and placed with respect to the end of the inlet conduit such that the slope provided between the edge of the stop plate and the inner wall of the end of the conduit with respect to horizontal surface of the stop plate is a relatively large angle, greater than the angle of repose or critical angle of flow for any granular solid which may be utilized within the contacting chamber. Where this angle is small or relatively close to the critical flow angle of the solid, only slow rates of flow through the device are possible. The critical angle of flow, or angle of repose, for a given material may be defined as the greatest angle at which that granular material will remain at equilibrium, or alternately, the slope at which the material starts to flow from a state of equilibrium.

In a more specific embodiment of this improved device for controlling the flow of sub-divided solid particles from an inlet conduit to the top of a fluidized particle bed maintained within a contacting chamber, the device comprises, a cup-shaped member having means supporting it below the particle inlet conduit in a manner having the upper edge of the walls thereof extend a short distance above the lower end of the inlet conduit and having particle outlet openings in the bottom of the member, with the particle openings having an aggregate area equivalent to at least the outlet area of the conduit, a flat circular imperforate stop plate placed centrally within the cup-shaped member and elevated above the bottom thereof, the stop plate also being positioned symmetrically below the particle inlet conduit a distance of one-half to one times the internal diameter of the conduit and in a manner providing an angle of slope between the outer edge of the stop plate and the lower inside wall line of the conduit, with respect to the top surface of the stop plate, which is approximately 70°, and the unobstructed area within said cup-shaped member between the wall thereof and the edge of the stop plate equal to at least four times the area of the particle outlet openings.

In a preferred embodiment of the device, it is also desirable that the stop plate be elevated above the bottom of the cup-shaped member a distance equal to at least one to two times the internal diameter of the lower end of the particle inlet conduit. The stop plate may be held in the elevated position by a pedestal, a plurality of legs extending upwardly from the bottom of the cup member, or by other suitable means.

The accompanying drawing and the following description thereof will serve to point out more clearly the construction and operation of the improved self-regulating device of this invention, as well as further advantages in its operation.

Figure 1 of the drawing is an elevational view, partially in section, of a typical contact chamber maintaining a bed of finely divided solid material and having the improved level regulating device of this invention.

Figure 2 of the drawing is a sectional plan view of the device as indicated by line 2—2 in Figure 1 of the drawing.

Figure 3 is a sectional elevational view showing a somewhat different embodiment and optional construction of the device which may be used at the lower end of a vertical inlet conduit to regulate the rate of particle flow and the level of a solid particle bed.

Referring now to Figures 1 and 2 of the drawing, the contacting chamber 1 is a substantially vertical chamber adapted to maintain a relatively dense moving or fluidized bed 2 of a granular or finely divided solid material in the lower portion thereof for contact with a vaporous or gaseous medium which is passed therethrough. The finely divided solid material is transferred to the interior of the chamber 1 through the vertical conduit 3 and after its contact with the fluid medium in bed 2 is subsequently discharged from the lower end of the chamber through an outlet 4. The fluid or gaseous medium which contacts the solid material, is charged to the lower end of the chamber through a line 5 and is distributed into the solid particle bed 2 by means of a suitable deflector plate or baffle 6 and a perforated distribution plate or grid 7. The reactant stream passes upwardly through the chamber and the particle bed to the upper portion of the contacting zone, which is above dense bed zone and is substantially free of solid material. Thus, the resulting product stream may be discharged therefrom through an outlet line 8. A partial separator and recovery unit (not shown) may be placed at the outlet opening, either inside or outside of the chamber 1.

In a moving bed operation the size of the solid particle and the rate of flow of the reactant stream is such that the latter flows upwardly countercurrently to the moving bed of material, but the particles are not agitated or fluidized to any extent. In a fluidized operation, the solid material is normally in a powdered or finely divided state and the rate of flow of the reactant stream entering the lower end of the chamber is such that the material is maintained in an agitated turbulent condition with the particles fluidized to such an extent that the density is appreciably less than that of the solid material in a settled non-agitated condition. The control of the upper level of the fluidized bed is somewhat more difficult than with a granular material which moves through a non-agitated bed, however, the present device is particularly adapted to maintain level control in a fluidized bed.

The regulating device of the embodiment illustrated, includes a cup-shaped member 9 having the outer wall thereof extend upwardly to a point above the lower end of the particle inlet conduit 3. The bottom of the cup member 9 has a plurality of holes 10, which in this embodiment are spaced around the outer periphery of the lower flat portion of the cup-shaped member. The cup member 9 may be supported from the conduit 3 by straps or rods 11 or held in position below the conduit by otherwise suitable supporting means. Within the interior of the cup member 9 and symmetrically positioned below the end of the conduit 3, is a stop member 12, which has a flat horizontal surface of somewhat larger area than the internal diameter of the feed conduit 3. The upper surface of the member 12 serves as a stop plate or surface over which the finely divided material from the conduit 3 must flow to reach the lower end of the cup member 9 and the particle outlet openings 10.

In the drawing there is indicated an angle X which is formed between the upper surface of the stop plate 12 and a plane extending between the outer edge of the plate 12 and the inner periphery of the lower end of the conduit 3 and which is preferably maintained at about 70°, in order that it be greater than the critical angle of flow of nearly all solid materials which may be used in a contacting chamber of this type. Also, the upper surface of the member 12 is preferably spaced below the end of the conduit 3 a distance of about one-half to one times the internal diameter of the conduit. The angle of repose for well formed spherical particles is of the order of 20° to 25°, while for irregularly shaped particles formed by crushing or grinding the angle of repose may be of the order of 60° to 65°. Thus, if the angle X is less than the critical angle of flow for a material which is being used, the latter will not flow evenly from the feed conduit 3, while if the angle X be only slightly greater than the angle of repose, the material may not flow over the stop plate 12 and through the device at a rate sufficiently rapid to maintain a desired operation of the contacting unit.

In operation, as solid particles are withdrawn from within the cup member 9 through the perforations 10, additional particles flow from the interior of the conduit 3 into the lower portion of the cup 9, or conversely, where the level of the particle bed 2 tends to rise and stop the flow from the holes 10, the level within the cup 9 also builds up slightly around the upper end of the stop plate 12 and the flow of material from the conduit 3 reaches an equilibrium, or an angle less than the critical flow angle and is stopped. As previously noted, it is an advantage of this device to have the stop member 12 elevated considerably above the lower end of the cup member 9 and to have an area between the plate 12 and the inside of the cup 9 which is considerably greater than the total area of the holes 10, so that while the particles within the cup member 9 may tend to be fluidized just above the holes 10, the enlarged area thereabove within the cup reduces the gas velocity to such an extent that fluidization no longer occurs and the upper surface of the solid particles within the cup is not disturbed and the control of the particle flow is maintained. In a preferred embodiment of the device the aggregate area of the holes 10 is, of course, at least equal to the area of the outlet end of the feed conduit 3, and the annular space, or area between the edge of the plate 12 and the inner wall of the cup-shaped member 9, is at least four times the combined area of the holes 10. It is also desirable to have the upper surface of the member 12 elevated above the lower end of the cup member 9 a distance in the range of from one to two times the internal diameter of the lower end of the conduit 3.

The cup member 9 in Figures 1 and 2 of the drawing is indicated to be cylindrical, having vertical walls extend from the lower end upwardly to a point extending beyond the lower end of the conduit 3, however, it is not necessary that the walls of the member be vertical and as illustrated in Figure 3 of the drawing, an alternate embodiment of the device has a slightly tapering wall 9' while placed around the lower end thereof are a plurality of holes 10' in lieu of their being within the bottom of the member.

Also shown in the embodiment of Figure 3 is a somewhat different form of the internal plate, indicated as 12', which provides an elevated surface or stop plate for the material flowing from the lower end of the conduit. The stop plate 12' may be supported by suitable legs 13 rather than by a solid pedestal, as shown in Figure 1 of the drawing. It is thus shown that it is not necessary that the various members of the regulating device have a fixed construction or form and the cup-shaped member 9 or 9' need not be of a circular cross section. However, the stop member 12, or the stop plate 12', must conform in shape with the feed conduit 3 and be placed symmetrically below the end of the conduit to insure that the particles flow evenly over the stop member into the lower portion of the cup member.

It is also within the scope of the invention to terminate a large standpipe, or feed conduit in a plurality of similar conduits, each having a regulating device as described.

I claim as my invention:

1. A self-regulating feeding device for controlling the flow of sub-divided solid particles to the top of a solids bed maintained within a contacting chamber and comprising in combination, a cup-like member in said chamber and having a perforated lower end, an inlet conduit extending downwardly into said member, and an imperforate stop plate positioned centrally within said cup-like member and elevated above the bottom thereof in a position a short distance below and in alignment with the end of said inlet conduit.

2. A device for controlling the flow of sub-divided solid particles to the upper portion of a fluidized particle bed maintained within a contacting chamber and comprising in combination, a cup-shaped member in said chamber and having a plurality of particle outlet openings in the lower portion thereof, a vertical inlet conduit extending into said chamber, said cup-shaped member positioned below said inlet conduit in a manner having the wall of said cup member extend above the bottom end of said vertical inlet conduit, and a flat imperforate stop plate having a contour similar to the lower end of said conduit and placed a short distance therebelow within the central portion of said cup-like member.

3. A device for controlling the flow of sub-divided solid particles into the upper portion of a fluidized particle bed maintained within a contacting chamber, said device comprising in combination, a cup-shaped member in said chamber and having particle outlet openings in the bottom thereof, a vertical inlet conduit extending into said chamber supporting means holding said member below said inlet conduit in a manner having the upper edge of the wall of said cup member extend a short distance above the lower end of said inlet conduit and with said particle openings having an aggregate area equivalent to at least the outlet area of said conduit, a flat imperforate, stop plate having a contour similar to the end of said inlet conduit and placed within said cup-shaped member symmetrically below said inlet conduit a distance providing a slope between the edge of said plate and the lower inside wall of said conduit with respect to the surface of said plate which is of the order of 70°, with said plate being spaced above the bottom of said cup-like member a distance of from one to two times the internal diameter of said inlet conduit, and the unobstructed area between the edge of said stop plate and the wall of said cup-member, is at least four times that of the total area of said particle outlet openings.

4. The device of claim 3 further characterized in that said stop plate is spaced below the end of said inlet conduit a distance of from one-half to one times the internal diameter of the conduit.

5. An apparatus for conducting solid particle and fluid contacting in a fluidized process and having means for maintaining a substantially constant level fluidized particle bed therein, comprising a confined and substantially vertical contacting chamber, a particle inlet conduit extending into said chamber and terminating vertically in the upper portion thereof, a particle outlet at the lower end of said chamber, a fluid inlet at the lower end of said chamber and a product outlet at the upper end thereof, a cup-shaped member having particle outlet openings in the lower end thereof and positioned below said particle inlet conduit in a manner having its walls extend above the lower end of said vertical inlet conduit, an imperforate stop plate positioned horizontally within the center of said cup-like chamber and below said inlet conduit, with said stop plate elevated above the bottom of said cup-like member a distance of from one to one-half times the inside diameter of said inlet conduit and with the area between the inner wall of said cup-like member and the edge of said stop plate being at least four times the total area of said particle outlet openings.

6. The apparatus of claim 5 further characterized in that said stop plate is spaced below the end of said inlet conduit a distance of one-half to one times the internal diameter of said conduit and provides therewith an angle of slope between the edge of said plate and the lower inside wall of said conduit, with respect to the surface of said plate, of the order of 70°.

JAMES HOEKSTRA.

REFERENCES CITED

The following references are of record in the file of this patent:

UNITED STATES PATENTS

| Number | Name | Date |
|---|---|---|
| 2,352,867 | Stowe | July 4, 1944 |